F. W. BOOTH.
CORN PLANTER.
APPLICATION FILED MAY 2, 1910.

975,673.

Patented Nov. 15, 1910.

3 SHEETS—SHEET 1.

Witnesses

Inventor
Frank W. Booth
By
Attorneys

F. W. BOOTH.
CORN PLANTER.
APPLICATION FILED MAY 2, 1910.

975,673.

Patented Nov. 15, 1910.
3 SHEETS—SHEET 2.

Witnesses

Inventor
Frank W. Booth
By Chandler & Chandler
Attorneys

F. W. BOOTH.
CORN PLANTER.
APPLICATION FILED MAY 2, 1910.

975,673.

Patented Nov. 15, 1910.

3 SHEETS—SHEET 3.

Witnesses

Inventor
Frank W. Booth
By
Attorneys

UNITED STATES PATENT OFFICE.

FRANK W. BOOTH, OF ROYALTON, MINNESOTA.

CORN-PLANTER.

975,673. Specification of Letters Patent. Patented Nov. 15, 1910.

Application filed May 2, 1910. Serial No. 558,801.

*To all whom it may concern:*

Be it known that I, FRANK W. BOOTH, a citizen of the United States, residing at Royalton, in the county of Morrison, State of Minnesota, have invented certain new and useful Improvements in Corn-Planters; and I do hereby declare the following to be a full, clear, and exact description of the invention, such as will enable others skilled in the art to which it appertains to make and use the same.

The invention relates to a corn planter and more particularly to the class of automatic check row corn planters.

The primary object of the invention is the provision of a machine of this character in which seed may be dropped into an open furrow at equal distances apart when the machine is being advanced through a field.

Another object of the invention is the provision of a machine of this character in which the furrow openers of the planter may be simultaneously adjusted for raising and lowering the same relative to the ground to increase or decrease the depth of a furrow when the machine is being drawn through a field for the planting operation thereof.

A further object of the invention is the provision of a machine of this character in which the trip arm of the seed distributing mechanism may be thrown into and out of the path of movement of a cam fixed to the wheeled supporting axle of the machine thereby controlling the delivery of seed from the seed boxes of the machine to open furrows in the ground without requiring the employment of clutch mechanism generally used in machines of this nature.

With these and other objects in view the invention consists in the construction, combination and arrangement of parts as will be hereinafter more fully described illustrated in the accompanying drawings disclosing the preferred form of embodiment of the invention and pointed out in the claims hereunto appended.

Figure 1:
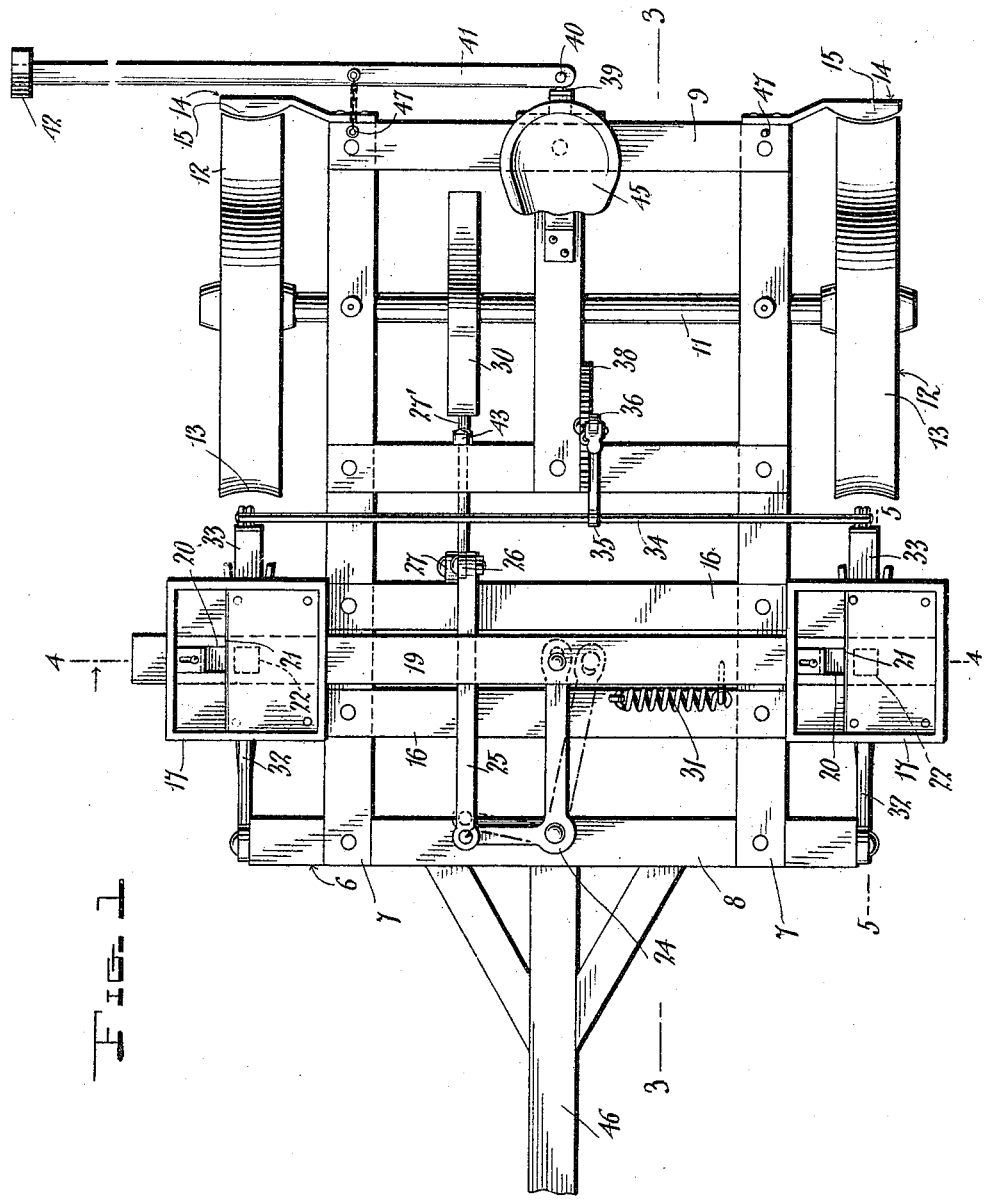
Figure 2:
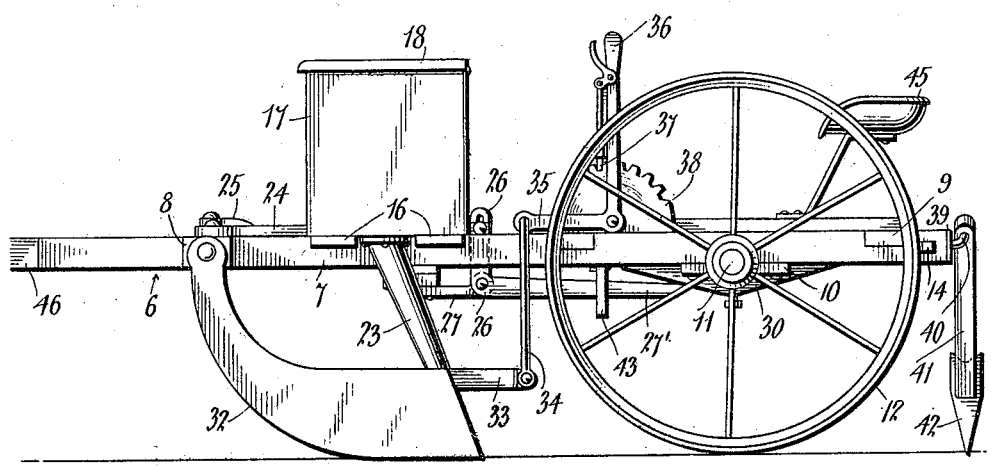
Figure 3:
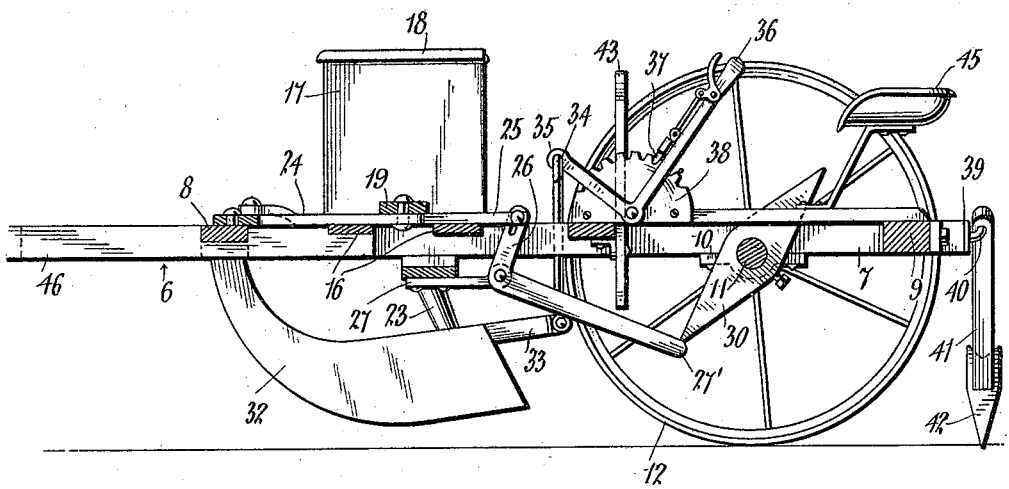
Figure 4:
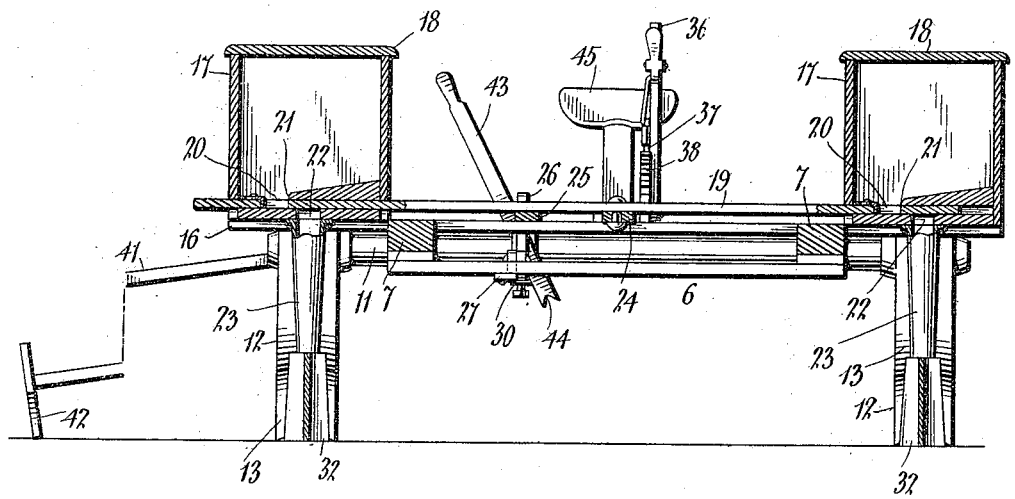
Figure 5:
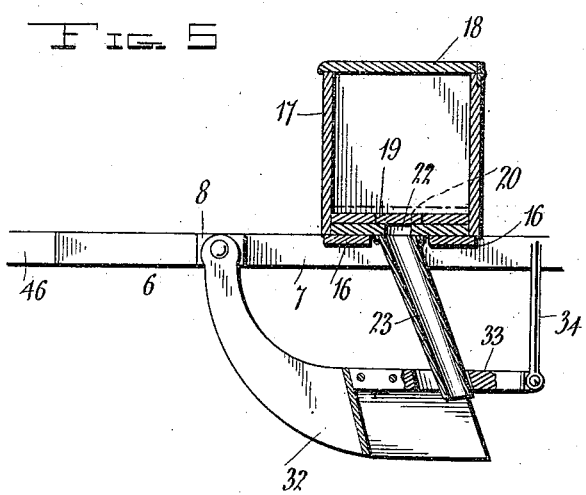

In the drawings:—Figure 1 is a top plan view of a machine constructed in accordance with the invention. Fig. 2 is a side elevation thereof. Fig. 3 is a vertical longitudinal sectional view through the machine on the line 3—3 of Fig. 1. Fig. 4 is a transverse sectional view on the line 4—4 of Fig. 1. Fig. 5 is a fragmentary vertical longitudinal sectional view on the line 5—5 of Fig. 1.

Similar reference characters indicate corresponding parts throughout the several views in the drawings.

Referring to the drawings by numerals 6 designates the main frame of the machine having spaced parallel side beams 7 united at opposite ends by front and rear beams 8 and 9, the side beams 7 near their rear ends being provided with bearings 10 secured to their under faces in which is journaled a main supporting axle 11 having fixed to opposite ends ground or supporting wheels 12 the peripheral or tread portions of which are channeled or concaved as at 13 in the usual manner thus preventing side skidding of the machine when the same is being advanced through a field. Secured to the rear cross beam 9 at opposite ends thereof are scraper elements 14 which latter have widened portions 15 the forward edges of which are correspondingly shaped to the channeled treads 13 of the wheels so as to prevent clogging of dirt in the channels of the wheels thereby scraping earth that might adhere to the treads of the wheels when the machine is in operation.

Near the forward end of the frame of the machine and secured to the side beams 7 thereof are spaced parallel transverse bars 16 the ends of which extend a considerable distance beyond the said side beams and upon these extended ends of the bars 16 are fixed seed hoppers or boxes 17 each being provided with a hinged lid or cover 18 whereby access may be had to the interior of the boxes when the occasion requires. In the bottoms of the seed boxes 17 are provided suitable guide ways in which is movably mounted a seed slide bar 19 the same freely movable through suitable openings in the interior sides of the seed boxes and this seed slide bar is provided with discharge ports 20 the same adapted to alternately register with delivery passages 21 in the bottoms of the seed boxes and ports 22 spaced from the latter and communicating with said delivery tubes are dropping spouts 23 fixed to and depending at a rearward inclination from the seed boxes so that seed may be delivered from the seed boxes through the spouts 23 into open furrows when the machine is being advanced through a field.

Pivoted centrally to the front cross beam 8 is a bell crank lever 24 the same having its long arm pivotally connected to the seed slide 19 while its short arm is pivotally connected to a link rod 25 the same being also pivotally connected to a trip lever or arm 26 which is pivoted to and supported by a rearwardly extending bracket 27 carried by a cross beam 8 transversely of the frame. This trip lever 26 has its long arm 27′ extended rearwardly in the path of movement of a duplex cam 30 fixed on the rotatable axle 11 so that on every half revolution of the said axle the elbow shaped trip lever 26 will be vibrated or rocked thus imparting reciprocatory movement to the seed slide 19 working within the seed boxes 17 for controlling the dropping of seed therefrom into open furrows. Secured to the seed slide 19 and one of the transverse bars 16 is a coiled retractile spring 31 serving to maintain the trip lever in positive engagement with the duplex cam 30 during the travel of the machine.

Pivotally connected to the ends of the front cross beam 8 are the upper ends of downwardly and rearwardly curved split or bifurcated shoes 32 in the tops 33 of which are formed guide openings receiving the delivery tubes or seed dropping spouts 23 and to these tops 33 are pivotally connected the extremities of an inverted U-shaped bail 34 pivoted to the right angular extension 35 of a throw lever 36 provided with the usual manually operable spring controlled locking pawl 37 normally engaging a toothed segment 38 rising from and fixed to the main frame of the machine. On shifting the throw lever 36 the shoes 32 may be adjusted relative to the ground thereby regulating the depth of cutting action thereof in the formation of open furrows in the earth.

Above the trip lever 26 and pivoted to the frame is a transversely movable rocking arm or lever 43 the lower end of which is notched as at 44 and this lever 43 is adapted to be moved into the vertical path of movement of the long arm 27′ of the trip lever 26 so as to hold it out of engagement with the duplex cam 30 thus effecting the stopping of the seed dropping mechanism of the machine. This lever 43 is normally shifted out of the vertical path of movement of the long arm 27′ of the trip lever so that said arm 27′ will be constantly engaged by the duplex cam 30 for the seed dropping operation of the machine.

Rising from the main frame of the machine is a seat post carrying a driver's seat 45 to be occupied by the teamster when the machine is being pulled through a field. Secured to the main frame and extending forwardly thereof centrally therefrom is the usual draft tongue 46 to which draft animals are to be attached when the machine is to be advanced.

From the foregoing it is thought that the construction and operation of the invention will be clearly understood and therefore a more extended explanation has been omitted.

What is claimed is:—

1. In a planter, a main frame, a wheeled axle supporting the frame, seed boxes superimposed upon the frame and having delivery tubes depending therefrom, a seed valve intersecting the communication between the delivery tubes and the seed boxes, a trip lever pivoted to the frame and an upstanding end pivotally connected with the slide valve, a duplex cam fixed to the axle and actuating said trip lever, and means movable into the path of the trip lever to hold it out of engagement with the duplex cam.

2. In a planter, a frame, a seed box thereon, having a delivery opening, a seed valve controlling the opening, an angular trip lever having a long and short arm pivoted by its short arm to the seed valve and pivotally supported on the frame, a wheeled shaft, a cam mounted on the shaft having opposite portions adapted to engage the long arm of the lever, and a lever pivoted for vertical movement on the frame adapted to laterally displace the trip lever relative to the cam.

3. In a corn planter, a frame, seed boxes mounted on opposite sides of the forward part of the frame, seed valves for controlling the delivery openings of the seed boxes, a slide bar operating through the seed boxes and connected with the seed valves and arranged transversely on the frame, a pin mounted on said slide bar, a horizontally moving lever having a long and short arm, the long arm having an oblong slot and being pivotally connected with the pin of the slide bar and the short arm being disposed transversely of the frame and forwardly of the long arm, a link member pivotally connected with the outer end of the short arm and extending rearwardly thereof, a lever having a long and short arm pivoted for vertical movement to the frame, the short arm of said last lever extending vertically and being pivotally connected to the forward end of the link member and the long arm thereof extended forwardly of said short arm, a wheeled supporting shaft for the frame, a cam member mounted on the shaft to engage the terminal of the long arm of the second lever, said cam member having tapering ends, and a spring secured at one end to the other frame and at the other end to the slide bar.

In testimony whereof, I affix my signature, in presence of two witnesses.

FRANK W. BOOTH.

Witnesses:
 WILLIAM J. CASEY,
 ALBERT BOOTH.